United States Patent
Ji et al.

(10) Patent No.: US 9,869,373 B2
(45) Date of Patent: Jan. 16, 2018

(54) TRANSMISSION FOR VEHICLE

(71) Applicant: Hyundai Motor Company, Seoul (KR)

(72) Inventors: Seong Wook Ji, Ansan-Si (KR); Kang Soo Seo, Yongin-si (KR); Jae Chang Kook, Hwaseong-si (KR); Won Min Cho, Hwaseong-si (KR); Myeong Hoon Noh, Seongnam-si (KR); Wook Jin Jang, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 117 days.

(21) Appl. No.: 14/921,969

(22) Filed: Oct. 23, 2015

(65) Prior Publication Data

US 2016/0356346 A1 Dec. 8, 2016

(30) Foreign Application Priority Data

Jun. 4, 2015 (KR) ........................ 10-2015-0079217

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC ....................................................... F16H 3/66
See application file for complete search history.

(56) References Cited

U.S. PATENT DOCUMENTS

| | | | | |
|---|---|---|---|---|
| 9,587,716 | B1* | 3/2017 | Park | F16H 3/66 |
| 9,599,197 | B1* | 3/2017 | Park | F16H 3/66 |
| 2006/0205556 | A1* | 9/2006 | Klemen | F16H 3/66 |
| | | | | 475/296 |
| 2013/0150203 | A1* | 6/2013 | Park | F16H 3/663 |
| | | | | 475/276 |
| 2016/0333977 | A1* | 11/2016 | Hwang | F16H 3/66 |
| 2017/0074364 | A1* | 3/2017 | Kwon | F16H 3/66 |
| 2017/0074369 | A1* | 3/2017 | Park | F16H 3/66 |

FOREIGN PATENT DOCUMENTS

| | | |
|---|---|---|
| KR | 10-2009-0097635 A | 9/2009 |
| KR | 10-2011-0131816 A | 12/2011 |
| KR | 10-2013-0003981 A | 1/2013 |
| KR | 10-2013-0031453 A | 3/2013 |
| KR | 10-2013-0032962 A | 4/2013 |

\* cited by examiner

*Primary Examiner* — Derek D Knight
(74) *Attorney, Agent, or Firm* — Morgan, Lewis & Bockius LLP

(57) ABSTRACT

A transmission for a vehicle may include a first planetary gear set, a second planetary gear set, a third, planetary gear set, and a fourth planetary gear set each including three rotary elements, and a plurality of friction members, wherein the friction members are connected to at least one of the rotary elements of the planetary gear sets and control rotation of the rotary elements.

9 Claims, 2 Drawing Sheets

FIG. 2

| GEAR | C1 | C2 | C3 | C4 | B1 | B2 | Gear ratio |
|---|---|---|---|---|---|---|---|
| 1ST |  | ○ | ○ |  | ○ |  | 5.000 |
| 2ND | ○ |  | ○ |  | ○ |  | 3.000 |
| 3RD | ○ | ○ |  |  | ○ |  | 2.520 |
| 4TH | ○ |  |  |  | ○ | ○ | 2.032 |
| 5TH | ○ |  |  | ○ | ○ |  | 1.523 |
| 6TH | ○ |  |  | ○ |  | ○ | 1.203 |
| 7TH | ○ | ○ |  | ○ |  |  | 1.000 |
| 8TH |  | ○ |  | ○ |  | ○ | 0.765 |
| 9TH |  |  | ○ | ○ |  | ○ | 0.677 |
| 10TH |  | ○ | ○ |  |  | ○ | 0.512 |
| REV |  | ○ |  | ○ | ○ |  | 2.632 |

TRANSMISSION FOR VEHICLE

CROSS REFERENCE TO RELATED APPLICATION

The present application claims priority to Korean Patent Application Number 10-2015-0079217 filed Jun. 4, 2015, the entire contents of which is incorporated herein for all purposes by this reference.

BACKGROUND OF THE INVENTION

Field of the Invention

The present invention relates to a transmission for a vehicle that can improve fuel efficiency by implementing multiple steps of shifting and improve vehicle driving comfort by using operating points in a low RPM range of an engine.

Description of Related Art

Recently, increasing oil prices have caused vehicle manufacturers all over the world to rush into infinite competition. Particularly in the case of engines, manufacturers have been pursuing efforts to reduce the weight and improve fuel efficiency of vehicles by reducing engine size, etc.

As for an automatic transmission, there are various methods of improving fuel efficiency, and operability and competitiveness in fuel efficiency can both be secured by implementing multiple steps of shifting.

However, when the shift ranges increase, the number of parts in an automatic transmission also increases, so the automatic transmission may be difficult to mount, the manufacturing cost and weight may be increased, and power transmission efficiency may be deteriorated.

Accordingly, in order to increase the effect of improving fuel efficiency through multiple steps of shifting, it may be important to develop a gear train structure that can achieve maximum efficiency with fewer parts.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a vehicle that can improve fuel efficiency by implementing multiple steps of shifting and improve vehicle driving comfort by using operating points in a low RPM range of an engine.

According to various aspects of the present invention, a transmission for a vehicle may include a first planetary gear set, a second planetary gear set, a third, planetary gear set, and a fourth planetary gear set each including three rotary elements, and a plurality of friction members, in which the first planetary gear set may include a first rotary element operating as a selectively-fixed element and connected with a second rotary element of the third planetary gear set, a second rotary element selectively connected with a first rotary element of the second planetary gear set, selectively connected with a third rotary element of the second planetary gear set, and selectively connected with a third rotary element of the third planetary gear set, and a third rotary element selectively connected with a second rotary element of the second planetary gear set, the second planetary gear set may include the first rotary element operating as a selectively-fixed element, the second rotary element connected to an input shaft, and the third rotary element connected with a first rotary element of the third planetary gear set, the third planetary gear set may include the first rotary element connected with a first rotary element of the fourth planetary gear set, and the second rotary element connected with a third rotary element of the fourth planetary gear set, the fourth planetary gear set may include a second rotary element connected to an output shaft, and the friction members may be connected to at least one of the rotary elements of the planetary gear sets and control rotation of the rotary elements.

In the first planetary gear set, the first rotary element may be a first sun gear, the second rotary element may be a first carrier, and the third rotary element may be a first ring gear, in the second planetary gear set, the first rotary element may be a second sun gear, the second rotary element may be a second carrier, and the third rotary element may be a second ring gear, in the third planetary gear set, the first rotary element may be a third sun gear, the second rotary element may be a third carrier, and the third rotary element may be a third ring gear, and in the fourth planetary gear set, the first rotary element may be a fourth sun gear, the second rotary element may be a fourth carrier, and the third rotary element may be a fourth ring gear.

The first rotary element of the first planetary gear set may be connected to and disconnected from a transmission case by a first brake, the second rotary element of the first planetary gear set and the first rotary element of the second planetary gear set may be connected to and disconnected from each other by a first clutch, the second rotary element of the first planetary gear set and the third rotary element of the second planetary gear set may be connected to and disconnected from each other by a third clutch, the second rotary element of the first planetary gear set and the third rotary element of the third planetary gear set may be connected to and disconnected from each other by a fourth clutch, and the third rotary element of the first planetary gear set and the second rotary element of the second planetary gear set may be connected to and disconnected from each other by second clutch.

The first rotary element of the second planetary gear set may be connected to and disconnected from a transmission case by a second brake.

The first planetary gear set, the second planetary gear set, the third planetary gear set, and the fourth planetary gear set may be sequentially arranged in an axial direction.

The friction members may include a first clutch disposed for connecting and disconnecting the second rotary element of the first planetary gear set and the first rotary element of the second planetary gear set, a second clutch disposed for connecting and disconnecting the third rotary element of the first planetary gear set and the second rotary element of the second planetary gear set, a third clutch disposed for connecting and disconnecting the second rotary element of the first planetary gear set and the third rotary element of the second planetary gear set, a fourth clutch disposed for connecting and disconnecting the second rotary element of the first planetary gear set and the third rotary element of the third planetary gear set, a first brake disposed for connecting and disconnecting the first rotary element of the first planetary gear set and a transmission case, and a second brake disposed for connecting and disconnecting the first rotary element of the second planetary gear set and the transmission case.

According to various aspects of the present invention, a transmission for a vehicle may include a first planetary gear set, a second planetary gear set, a third, planetary gear set, and a fourth planetary gear set each including three rotary elements, an input shaft connected to a second rotary element of the second planetary gear set and a second clutch, a first shaft connecting a first rotary element of the first planetary gear set, a first brake, a second rotary element of the third planetary gear set, and a third rotary element of the fourth planetary gear set, a second shaft connecting a first rotary element of the second planetary gear set, a first clutch, and a second brake, a third shaft connecting a second planetary gear set, the first clutch, a third clutch, and a fourth clutch, a fourth shaft connecting a third rotary element of the first planetary gear set and a second clutch, a fifth shaft connecting a first rotary element of the fourth planetary gear set, a first rotary element of the third planetary gear set, a third rotary element of the second planetary gear set, and the third clutch, a sixth shaft connecting a third rotary element of the third planetary gear set and a fourth clutch, an output shaft connected with a second rotary element of the fourth planetary gear set, and a transmission case connected with a first brake and a second brake.

The first clutch may be disposed for connecting and disconnecting the second shaft and the third shaft. the second clutch may be disposed for connecting and disconnecting the input shaft and the fourth shaft, the third clutch may be disposed for connecting and disconnecting the third shaft and the fifth shaft, the fourth clutch may be disposed for connecting and disconnecting the third shaft and the sixth shaft, the first brake may be disposed for connecting and disconnecting the first shaft and the transmission case, and the second brake may be disposed for connecting and disconnecting the second shaft and the transmission case.

The first clutch may be disposed for connecting and disconnecting the second rotary element of the first planetary gear set and the first rotary element of the second planetary gear set, the second clutch may be disposed for connecting and disconnecting the third rotary element of the first planetary gear set and the second rotary element of the second planetary gear set, the third clutch may be disposed for connecting and disconnecting the second rotary element of the first planetary gear set and the third rotary element of the second planetary gear set, the fourth clutch may be disposed for connecting and disconnecting the second rotary element of the first planetary gear set and the third rotary element of the third planetary gear set, the first brake may be disposed for connecting and disconnecting the first rotary element of the first planetary gear set and the transmission case, and the second brake may be disposed for connecting and disconnecting the first rotary element of the second planetary gear set and the transmission case.

As described above, since the rotary elements of the first, second, third, and fourth planetary gear sets are selectively connected/disconnected by clutches and brakes, their rotational speeds and directions are changed and shifting is performed accordingly. Therefore, a vehicle can be driven with the gear ratios of ten or more steps of forward shifting and one step of reverse shifting. Therefore, it is possible to improve fuel efficiency by implementing multiple steps of shifting and improve vehicle driving comfort by using operating points in a low RPM range of an engine.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing operation in each range by an exemplary transmission for a vehicle according to the present invention.

Figure 1:
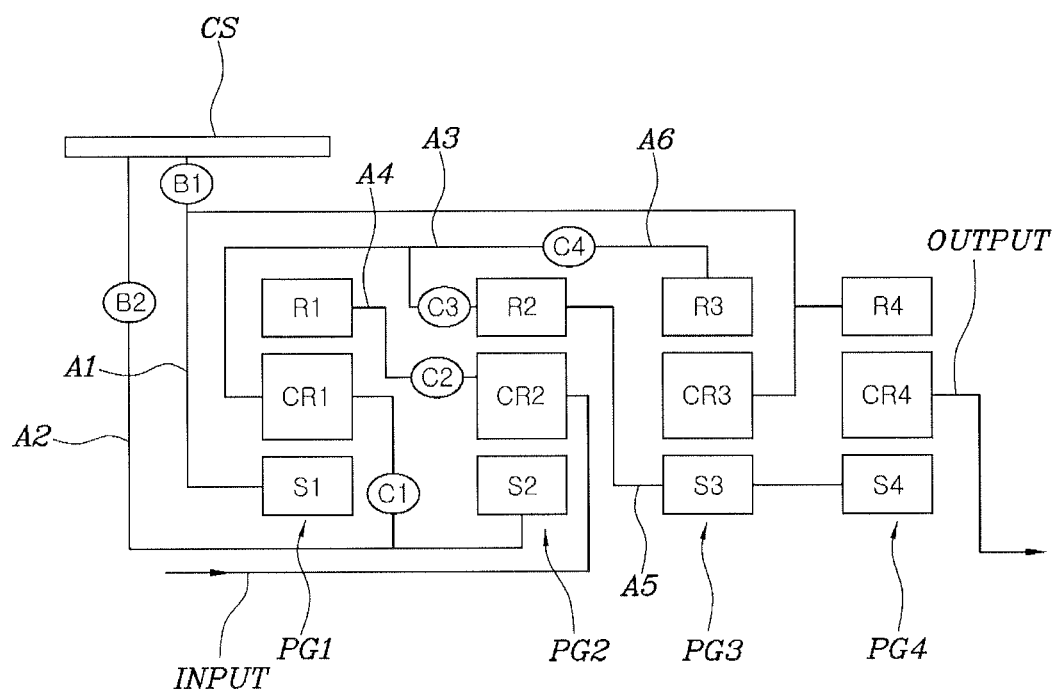
FIG. 1 is a diagram schematically showing the structure of an exemplary transmission for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A transmission for a vehicle according to various embodiments of the present invention largely includes a first planetary gear set PG1, a second planetary gear set PG2, a third planetary gear set PG3, and a fourth planetary gear set PG4, and the planetary gear sets each may include three rotary elements, that is, first, second, and third rotary elements.

Referring to FIG. 1, the first rotary element of the first planetary gear set PG1 may operate as a selectively-fixed element. For example, the first rotary element of the first planetary gear set PG1 may be a first sun gear S1 and the first sun gear S1 can be connected/disconnected to/from a transmission case CS by a friction member.

The first rotary element of the first planetary gear set PG1 may be connected with the second rotary element of the third planetary gear set PG3. For example, the second rotary element of the third planetary gear set PG3 may be a third carrier CR3, and the first sun gear S1 and the third carrier CR3 can be directly connected to each other.

The second rotary element of the first planetary gear set PG1 may be selectively connected with the first rotary element of the second planetary gear set PG2. For example, the second rotary element of the first planetary gear set PG1 may be a first carrier CR1 and the first rotary element of the second planetary gear set PG2 may be a second sun gear S2, so the first carrier CR1 and the second sun gear S2 can be connected/disconnected to/from each other by a friction member.

The second rotary element of the first planetary gear set PG1 may be selectively connected with the third rotary element of the second planetary gear set PG2. For example, the third rotary element of the second planetary gear set PG2 may be a second ring gear R2, and the first carrier CR1 and the second ring gear R2 can be connected/disconnected to/from each other by a friction member.

The second rotary element of the first planetary gear set PG1 may be selectively connected with the third rotary element of the third planetary gear set PG3. For example, the third rotary element of the third planetary gear set PG3 may be a third ring gear R3, and the first carrier CR1 and the third ring gear R3 can be connected/disconnected to/from each other by a friction member.

The first rotary element of the second planetary gear set PG2 may operate as a selectively-fixed element. For example, the first rotary element of the second planetary gear set PG2 may be a second sun gear S2 and the second sun gear S2 can be connected/disconnected to/from the transmission case CS by a friction member.

The second rotary element of the second planetary gear set PG2 may be connected to an input shaft INPUT. For example, the second rotary element of the second planetary gear set PG2 may be a second carrier CR2 and the second carrier CR2 may operate as a constant input element by being directly connected to the input shaft INPUT.

The third rotary element of the second planetary gear set PG2 may be connected with the first rotary element of the third planetary gear set PG3. For example, the third rotary element of the second planetary gear set PG2 may be a second ring gear R2 and the first rotary element of the third planetary gear set PG3 may be a third sun gear S3, so the second ring gear R2 and the third sun gear S3 can be directly connected to each other.

The first rotary element of the third planetary gear set PG3 may be connected with the first rotary element of the fourth planetary gear set PG4. For example, the first rotary element of the third planetary gear set PG3 may be a third sun gear S3 and the first rotary element of the fourth planetary gear set PG4 may be a fourth sun gear S4, so the third sun gear S3 and the fourth sun gear S4 can be directly connected to each other.

The second rotary element of the third planetary gear set PG3 may be connected with the third rotary element of the fourth planetary gear set PG4. For example, the second rotary element of the third planetary gear set PG3 may be a third carrier CR3 and the third rotary element of the fourth planetary gear set PG4 may be a fourth ring gear R4, so the third carrier CR3 and the fourth ring gear R4 can be directly connected to each other.

The second rotary element of the fourth planetary gear set PG4 may be connected to an output shaft OUTPUT. For example, the second rotary element of the fourth planetary gear set PG4 may be a fourth carrier CR4 and the fourth carrier CR4 may operate as a constant output element by being directly connected to the output shaft OUTPUT.

In the present invention, the first planetary gear set PG1, second planetary gear set PG2, third planetary gear set PG3, and fourth planetary gear set PG4 may be sequentially arranged in the axial direction of the input shaft INPUT and the output shaft OUTPUT. Further, all of the first planetary gear set PG1, second planetary gear set PG2, third planetary gear set PG3, and fourth planetary gear set PG4 may be single pinion planetary gear sets.

The present invention may further include a plurality of friction members connected to at least one or more of the rotary elements of the planetary gear sets and controlling rotation of the rotary elements. The friction members may be first, second, third, and fourth clutches C1, C2, C3, and C4, and first and second brakes B1 and B2.

In detail, the first clutch C1 may be disposed for connecting/disconnecting the first carrier CR1 that is the second rotary element of the first planetary gear set PG1 and the second sun gear S2 that is the first rotary element of the second planetary gear set PG2.

The second clutch C2 may be disposed for connecting/disconnecting the first ring gear R1 that is the third rotary element of the first planetary gear set PG1 and the second carrier CR2 that is the second rotary element of the second planetary gear set PG2.

The third clutch C3 may be disposed for connecting/disconnecting the first carrier CR1 that is the second rotary element of the first planetary gear set PG1 and the second ring gear R2 that is the third rotary element of the second planetary gear set PG3.

The fourth clutch C4 may be disposed for connecting/disconnecting the first carrier CR1 that is the second rotary element of the first planetary gear set PG1 and the third ring gear R3 that is the third rotary element of the third planetary gear set PG3.

The first brake B1 may be disposed for connecting/disconnecting the first sun gear S1, which is the first rotary element of the first planetary gear set PG1, and the transmission case CS.

The second brake B2 may be disposed for connecting/disconnecting the second sun gear S2, which is the first rotary element of the second planetary gear set PG2, and the transmission case CS.

On the other hand, the rotary elements of the planetary gear sets may be connected through the input shaft INPUT, a first shaft A1 to a sixth shaft A6, and the output shaft OUTPUT.

Referring to FIG. 1, the second rotary element of the second planetary gear set PG2 and a first side of the second clutch C2 may be connected to the input shaft INPUT.

The first rotary element of the first planetary gear set PG1, a first side of the first brake B1, the second rotary element of the third planetary gear set PG3, and the third rotary element of the fourth planetary gear set PG4 may be connected to the first shaft A1.

The first rotary element of the second planetary gear set PG2, a first side of the first clutch C1, and a side of the second brake B2 may be connected to the second shaft A2.

The second rotary element of the first planetary gear set PG1, a second side of the first clutch C1, a first side of the third clutch C3, and a first side of the fourth clutch C4 may be connected to the third shaft A3.

The third rotary element of the first planetary gear set PG1 and a second side of the second clutch C2 may be connected to the fourth shaft A4.

The first rotary element of the fourth planetary gear set PG4, the first rotary element of the third planetary gear set PG3, the third rotary element of the second planetary gear set PG2, and a second side of the third clutch C3 may be connected to the fifth shaft A5.

The third rotary element of the third planetary gear set PG3 and a second side of the fourth clutch C4 may be connected to the sixth shaft A6.

The second rotary element of the fourth planetary gear set PG4 may be connected to the output shaft OUTPUT.

A second side of the first brake B1 and a second side of the second brake B2 may be fixed to the transmission case CS.

For example, the first clutch C1 may be disposed for connecting/disconnecting the second shaft A2 and the third shaft A3, the second clutch C2 may be disposed for connecting/disconnecting the input shaft INPUT and the fourth shaft A4, the third clutch C3 may be disposed for connecting/disconnecting the third shaft A3 and the fifth shaft A5, and the fourth clutch C4 may be disposed for connecting/disconnecting the third shaft A3 and the sixth shaft A6.

The first brake B1 may be disposed for connecting/disconnecting the first shaft A1 and the transmission case and the second brake B2 may be disposed for connecting/disconnecting the second shaft A2 and the transmission case CS.

FIG. 2 is a table showing operation in each range by a transmission for a vehicle according to an embodiment of the present invention, in which, for example, in order to implement a 1-range gear ratio, the second clutch C2, third clutch C2, and first brake B1 may be connected and all other friction members may be all disconnected.

In order to implement a 2-range gear ratio, the first clutch C1, third clutch C3, and first brake B1 may be connected and all other friction members may be all disconnected. Further, as for the other ranges, a vehicle can be driven with the gear ratios corresponding to the ranges by connecting/disconnecting, as shown in the table.

As described above, since the rotary elements of the first, second, third, and fourth planetary gear sets PG1, PG2, PG3, and PG4 are selectively connected/disconnected by clutches and brakes, their rotational speeds and directions are changed and shifting is performed accordingly. Therefore, a vehicle can be driven with the gear ratios of ten or more steps of forward shifting and one step of reverse shifting. Therefore, it is possible improve fuel efficiency by implementing multiple steps of shifting and improve vehicle driving comfort by using operating points in a low RPM range of an engine.

On the other hand, although the present invention was described with reference to the detailed embodiments, it is apparent to those skilled in the art that the present invention may be changed and modified in various ways without departing from the scope of the present invention and it should be noted that the changes and modifications are included in claims.

What is claimed is:

1. A transmission for a vehicle, comprising:
   a first planetary gear set including a first rotary element, a second rotary element, and a third rotary element, a second planetary gear set including a first rotary element, a second rotary element, and a third rotary element, a third, planetary gear set including a first rotary element, a second rotary element, and a third rotary element, and a fourth planetary gear set including a first rotary element, a second rotary element, and a third rotary element; and
   a plurality of friction members,
   wherein the first planetary gear set includes:
      the first rotary element operating as a selectively-fixed element and connected with the second rotary element of the third planetary gear set;
      the second rotary element selectively connected with the first rotary element of the second planetary gear set, selectively connected with the third rotary element of the second planetary gear set, and selectively connected with the third rotary element of the third planetary gear set; and
      the third rotary element selectively connected with the second rotary element of the second planetary gear set;
   the second planetary gear set includes:
      the first rotary element operating as a selectively-fixed element;
      the second rotary element connected to an input shaft; and
      the third rotary element connected with the first rotary element of the third planetary gear set;
   the third planetary gear set includes:
      the first rotary element connected with the first rotary element of the fourth planetary gear set; and
      the second rotary element connected with the third rotary element of the fourth planetary gear set;
   the fourth planetary gear set includes:
      the second rotary element connected to an output shaft; and
   each of the friction elements is disposed between at least one rotation element of the first, second, third, and fourth planetary gear sets and another rotation element of the first, second, third, and fourth planetary gear sets, or mounted to at least one rotation element of the first, second, third, and fourth planetary gear sets.

2. The transmission of claim 1, wherein the first rotary element of the first planetary gear set is a first sun gear, the second rotary element of the first planetary gear set is a first carrier, and the third rotary element of the first planetary gear set is a first ring gear,
   the first rotary element of the second planetary gear set is a second sun gear, the second rotary element of the second planetary gear set is a second carrier, and the third rotary element of the second planetary gear set is a second ring gear,
   the first rotary element of the third planetary gear set is a third sun gear, the second rotary element of the third planetary gear set is a third carrier, and the third rotary element of the third planetary gear set is a third ring gear, and
   the first rotary element of the fourth planetary gear set is a fourth sun gear, the second rotary element of the fourth planetary gear set is a fourth carrier, and the third rotary element of the fourth planetary gear set is a fourth ring gear.

3. The transmission of claim 2, wherein the first rotary element of the first planetary gear set is connected to and disconnected from a transmission case by a first brake,
   the second rotary element of the first planetary gear set and the first rotary element of the second planetary gear set are connected to and disconnected from each other by a first clutch,
   the second rotary element of the first planetary gear set and the third rotary element of the second planetary gear set are connected to and disconnected from each other by a third clutch,
   the second rotary element of the first planetary gear set and the third rotary element of the third planetary gear set are connected to and disconnected from each other by a fourth clutch, and
   the third rotary element of the first planetary gear set and the second rotary element of the second planetary gear set are connected to and disconnected from each other by a second clutch.

4. The transmission of claim 2, wherein the first rotary element of the second planetary gear set is connected to and disconnected from a transmission case by a second brake.

5. The transmission of claim 2, wherein the first planetary gear set, the second planetary gear set, the third planetary gear set, and the fourth planetary gear set are sequentially arranged in an axial direction.

6. The transmission of claim 1, wherein the friction members include:
- a first clutch disposed for connecting and disconnecting the second rotary element of the first planetary gear set and the first rotary element of the second planetary gear set;
- a second clutch disposed for connecting and disconnecting the third rotary element of the first planetary gear set and the second rotary element of the second planetary gear set;
- a third clutch disposed for connecting and disconnecting the second rotary element of the first planetary gear set and the third rotary element of the second planetary gear set;
- a fourth clutch disposed for connecting and disconnecting the second rotary element of the first planetary gear set and the third rotary element of the third planetary gear set;
- a first brake disposed for connecting and disconnecting the first rotary element of the first planetary gear set and a transmission case; and
- a second brake disposed for connecting and disconnecting the first rotary element of the second planetary gear set and the transmission case.

7. A transmission for a vehicle, comprising:
- a first planetary gear set, a second planetary gear set, a third, planetary gear set, and a fourth planetary gear set each including three rotary elements;
- an input shaft connected to a second rotary element of the second planetary gear set and a second clutch;
- a first shaft connecting a first rotary element of the first planetary gear set, a first brake, a second rotary element of the third planetary gear set, and a third rotary element of the fourth planetary gear set;
- a second shaft connecting a first rotary element of the second planetary gear set, a first clutch, and a second brake;
- a third shaft connecting a second planetary gear set, the first clutch, a third clutch, and a fourth clutch;
- a fourth shaft connecting a third rotary element of the first planetary gear set and a second clutch;
- a fifth shaft connecting a first rotary element of the fourth planetary gear set, a first rotary element of the third planetary gear set, a third rotary element of the second planetary gear set, and the third clutch;
- a sixth shaft connecting a third rotary element of the third planetary gear set and a fourth clutch;
- an output shaft connected with a second rotary element of the fourth planetary gear set; and
- a transmission case connected with a first brake and a second brake.

8. The transmission of claim 7, wherein the first clutch is disposed for connecting and disconnecting the second shaft and the third shaft;
- the second clutch is disposed for connecting and disconnecting the input shaft and the fourth shaft;
- the third clutch is disposed for connecting and disconnecting the third shaft and the fifth shaft;
- the fourth clutch is disposed for connecting and disconnecting the third shaft and the sixth shaft;
- the first brake is disposed for connecting and disconnecting the first shaft and the transmission case; and
- the second brake is disposed for connecting and disconnecting the second shaft and the transmission case.

9. The transmission of claim 8, wherein the first clutch is disposed for connecting and disconnecting the second rotary element of the first planetary gear set and the first rotary element of the second planetary gear set;
- the second clutch is disposed for connecting and disconnecting the third rotary element of the first planetary gear set and the second rotary element of the second planetary gear set;
- the third clutch is disposed for connecting and disconnecting the second rotary element of the first planetary gear set and the third rotary element of the second planetary gear set;
- the fourth clutch is disposed for connecting and disconnecting the second rotary element of the first planetary gear set and the third rotary element of the third planetary gear set;
- the first brake is disposed for connecting and disconnecting the first rotary element of the first planetary gear set and the transmission case; and
- the second brake is disposed for connecting and disconnecting the first rotary element of the second planetary gear set and the transmission case.

* * * * *